United States Patent
Martinez et al.

(10) Patent No.: US 10,598,263 B2
(45) Date of Patent: Mar. 24, 2020

(54) ACTUATOR FOR VEHICLE LATCH AND VEHICLE LATCH WITH ACTUATOR

(71) Applicant: INTEVA PRODUCTS, LLC, Troy, MI (US)

(72) Inventors: Alfredo Martinez, Chihuahua (MX); Eduardo Estrada, Chihuahua (MX); Ian Dow, Bloomfield, MI (US); Francisco Vazquez, Chihuahua (MX)

(73) Assignee: INTEVA PRODUCTS, LLC, Troy, MI (US)

( * ) Notice: Subject to any disclaimer, the term of this patent is extended or adjusted under 35 U.S.C. 154(b) by 249 days.

(21) Appl. No.: 14/623,451

(22) Filed: Feb. 16, 2015

(65) Prior Publication Data
US 2015/0233452 A1    Aug. 20, 2015

Related U.S. Application Data

(60) Provisional application No. 61/940,423, filed on Feb. 15, 2014, provisional application No. 61/942,833, filed on Feb. 21, 2014.

(51) Int. Cl.
*F16H 19/04* (2006.01)
*E05B 81/24* (2014.01)
(Continued)

(52) U.S. Cl.
CPC ............. *F16H 19/04* (2013.01); *E05B 81/25* (2013.01); *F16D 43/26* (2013.01); *E05B 81/06* (2013.01);
(Continued)

(58) Field of Classification Search
CPC ........ F16D 43/26; F16H 19/04; F16H 37/124; F16H 1/16; Y10T 74/18792; E05B 81/06;
(Continued)

(56) References Cited

U.S. PATENT DOCUMENTS

| 3,566,703 A | 3/1971 | Van Noord |
| 3,969,789 A | 7/1976 | Wize |

(Continued)

FOREIGN PATENT DOCUMENTS

| CN | 2288243 Y | 8/1998 |
| CN | 2331739 Y | 8/1999 |

(Continued)

OTHER PUBLICATIONS

CN 2331739 Y (Zhigang Zhang) Apr. 8, 1999. [online] [retrieved on Feb. 1, 2019]. Retrieved from Proquest Dialog. https://dialog.proquest.com/professional/patents/docview/1363072426/168114E9A3B5F657D/1?accountid=161361 (Year: 1999).*

(Continued)

*Primary Examiner* — William Kelleher
*Assistant Examiner* — Joseph Brown
(74) *Attorney, Agent, or Firm* — Cantor Colburn LLP (57) ABSTRACT

An actuator for a latch is provided, the actuator having: a motor operatively coupled to a gear train; and a rack moveably mounted to the actuator for linear movement with respect to a housing of the actuator, wherein the gear train comprises: a worm; a worm gear and a pinion gear, wherein the pinion gear is rotatably mounted to the worm gear and the pinion gear has a plurality of teeth configured to engage a portion of the rack, wherein the axis of rotation of the worm is perpendicular to the axis of rotation of the worm gear and the pinion gear.

7 Claims, 6 Drawing Sheets

(51) Int. Cl.
*F16D 43/26* (2006.01)
*E05B 81/16* (2014.01)
*E05B 81/06* (2014.01)
*E05B 81/64* (2014.01)
*E05B 81/34* (2014.01)
*F16H 1/16* (2006.01)
*F16H 37/12* (2006.01)

(52) U.S. Cl.
CPC .............. *E05B 81/16* (2013.01); *E05B 81/34* (2013.01); *E05B 81/64* (2013.01); *F16H 1/16* (2013.01); *F16H 37/124* (2013.01); *Y10T 74/18792* (2015.01); *Y10T 292/1018* (2015.04)

(58) Field of Classification Search
CPC .......... E05B 81/16; E05B 81/25; E05B 81/34; E05B 81/64
USPC ...................... 74/422, 425, 426, 33
See application file for complete search history.

(56) References Cited

U.S. PATENT DOCUMENTS

| | | | |
|---|---|---|---|
| 4,135,377 A | 1/1979 | Kleefeldt et al. | |
| 4,269,440 A | 5/1981 | Gelhard | |
| 4,921,288 A | 5/1990 | Cifuentes et al. | |
| 5,236,234 A | 8/1993 | Norman | |
| 5,503,441 A | 4/1996 | Schwaiger | |
| 5,649,726 A * | 7/1997 | Rogers, Jr. ............... | E05B 81/06 292/201 |
| 5,746,076 A | 5/1998 | Inoue | |
| 6,494,505 B2 * | 12/2002 | Kobayashi .............. | E05B 85/01 292/201 |
| 6,568,741 B1 | 5/2003 | Leung | |
| 6,655,179 B2 | 12/2003 | Kobayashi et al. | |
| 6,679,531 B2 | 1/2004 | Rogers, Jr. et al. | |
| 7,270,029 B1 * | 9/2007 | Papanikolaou ......... | E05B 81/14 185/37 |
| 7,448,237 B2 | 11/2008 | Shimada et al. | |
| 8,348,310 B2 | 1/2013 | Vazquez et al. | |
| 8,505,346 B2 * | 8/2013 | Sugimoto ......... | B60R 25/02153 70/186 |
| 8,677,690 B2 | 3/2014 | Lee et al. | |
| 9,046,439 B2 * | 6/2015 | Taurasi, I .............. | G01M 17/00 |
| 9,140,037 B2 * | 9/2015 | Nagaoka ................ | E05B 77/34 |
| 9,194,162 B2 * | 11/2015 | Perkins ................... | E05B 81/28 |
| 2001/0015305 A1 | 8/2001 | Spurr | |
| 2002/0050721 A1 | 5/2002 | Kobayashi et al. | |
| 2010/0127512 A1 | 5/2010 | Vazquez et al. | |
| 2011/0204659 A1 | 8/2011 | Estrada et al. | |
| 2011/0254288 A1 * | 10/2011 | Gaucher ................. | E05B 85/26 292/240 |
| 2012/0175896 A1 * | 7/2012 | Martinez ................. | E05B 81/06 292/199 |
| 2012/0292927 A1 | 11/2012 | Vazquez et al. | |
| 2013/0300133 A1 * | 11/2013 | Margheritti ............. | E05B 77/34 292/100 |
| 2014/0292000 A1 | 10/2014 | Vazquez et al. | |
| 2015/0115618 A1 | 4/2015 | Ito et al. | |
| 2015/0137527 A1 * | 5/2015 | Hattori ................... | E05B 81/06 292/144 |
| 2015/0233147 A1 | 8/2015 | Martinez et al. | |

FOREIGN PATENT DOCUMENTS

| | | | |
|---|---|---|---|
| CN | 2635835 Y | 8/2004 | |
| CN | 102877717 A | 1/2013 | |
| WO | WO 2010031997 A1 * | 3/2010 | ............. E05B 81/25 |

OTHER PUBLICATIONS

CN Office Action dated Sep. 19, 2017 for Applicaiton No. 201510084971.3.
English Machine Translation of Specification and Claims for CN102877717A.
English Machine Translation of Specification and Claims for CN2288243Y.
English Machine Translation of Specification and Claims for CN2331739Y.
English Machine Translation of Specification and Claims for CN2635835Y.
English Translation to CN Office Action dated Sep. 19, 2017 for Applicaiton No. 201510084971.3.
English Translation to Office Action for CN 201510084971.3 dated Oct. 8, 2016.
English Translation to Office Action for CN 201510085142.7 dated Nov. 22, 2016.
Office Action for CN 201510084971.3 dated Oct. 8, 2016.
Office Action for CN 201510085142.7 dated Nov. 22, 2016.
Search Report for CN Application No. 2015100849713 , dated Feb. 16, 2015, 2 Pages.
Search Report for CN Application No. 201510085142.7.

* cited by examiner

FIG. 6

ACTUATOR FOR VEHICLE LATCH AND VEHICLE LATCH WITH ACTUATOR

CROSS REFERENCE TO RELATED APPLICATIONS

This application claims the benefit of U.S. Provisional Patent Application Ser. No. 61/940,423 filed on Feb. 15, 2014, the entire contents of which are incorporated herein by reference thereto.

This application also claims the benefit of U.S. Provisional Patent Application Ser. No. 61/942,833 filed Feb. 21, 2014, the entire contents of which are incorporated herein by reference thereto.

BACKGROUND

Various embodiments of the present invention relate to a latch and more particularly, an actuator for a vehicle latch.

In some applications, latches are required to perform numerous operations within limited confines of an application area of the item they are installed in.

Accordingly, it is desirable to provide a latch with an actuator that is able to perform the required functions while being subject to certain space requirements.

SUMMARY OF THE INVENTION

An actuator for a latch is provided. The actuator having: a motor operatively coupled to a gear train; and a rack moveably mounted to the actuator for linear movement with respect to a housing of the actuator, wherein the gear train comprises: a worm; a worm gear and a pinion gear, wherein the pinion gear is rotatably mounted to the worm gear and the pinion gear has a plurality of teeth configured to engage a portion of the rack, wherein the axis of rotation of the worm is perpendicular to the axis of rotation of the worm gear and the pinion gear.

BRIEF DESCRIPTION OF THE DRAWINGS

These and/or other features, aspects, and advantages of the present invention will become better understood when the following detailed description is read with reference to the accompanying drawings in which like characters represent like parts throughout the drawings, wherein.

Although the drawings represent varied embodiments and features of the present invention, the drawings are not necessarily to scale and certain features may be exaggerated in order to illustrate and explain exemplary embodiments of the present invention. The exemplification set forth herein illustrates several aspects of the invention, in one form, and such exemplification is not to be construed as limiting the scope of the invention in any manner.

DETAILED DESCRIPTION

Reference is made to the following U.S. Pat. Nos. 3,969,789; 6,568,741; 6,679,531; 8,348,310 and U.S. Patent Publication Nos. US 2010/0127512; US 2011/0204659; US 2012/0292927 and provisional Patent Application Ser. No. 61/806,530 filed Mar. 29, 2013, the entire contents each of which are incorporated herein by reference thereto.

Referring now to the FIGS. and in particular, FIGS. 1-6, an actuator 10 for a latch is illustrated. In one embodiment, the latch is a vehicle door latch or any other type of vehicle latch. Latch has an actuator 10 operatively coupled to components of the latch that are located within a latch housing. In one embodiment, a rack 12 is movably mounted to the actuator 10. Movement of the rack 12 actuates other component(s) of the latch, for example a detent lever or pawl that operatively engages a claw or fork bolt of the latch and thus movement of the rack can place the latch that is operatively coupled to the actuator in a locked or unlocked state. It is, of course, understood that the rack may also be configured to operatively engage other components of the latch such as a lock lever. It is, of course, understood that the lock lever may also be configured to operatively engage other components of the latch and the interaction of the lock lever to the detent lever is one of many applications and/or operations that may be used alone or in combination with other features/operations of the latch. For example, movement of the lock lever via movement of the rack may couple or uncouple a detent lever or pawl of the latch from a release lever or release handle such that movement of the same may either open the latch or have no effect on the latch. In other words movement of the lock lever via movement of the rack locks or unlocks the latch by coupling or uncoupling components of the latch through movement of the lock lever operably coupled to an end of the rack. Still further and in an alternative embodiment, the rack may comprise or be a portion of the lock lever such that movement of the rack causes the desired latch function.

In one embodiment, the rack 12 is driven by a motor 14 of the actuator 10 via a gear train 16 operatively coupled to the motor 14 and the rack 12. As illustrated, the actuator 10 only utilizes three gears that are also three separate components to reduce the velocity and allow the last component (e.g., rack 12) in the mechanism to exert the required force. The first component of the gear train 16 which is connected to the motor shaft is a helical gear normally called a worm 18. The second component is a helical gear normally called a worm gear 20 which is mounted at a ninety degree angle with respect to the first gear or worm's axis of rotation 22. The worm gear's axis of rotation is illustrated as axis 24. This second gear 20 is in turn connected via a positive and unique surface contact with a component or pinion gear 26 that has a spur gear, which in turn moves the rack 12, which is the last component and output of the actuator 10.

The described crossed axis gear train mechanism has several advantages with respect to other actuators in that the number of required gears is reduced to only three and the number of gear meshes or gear pairs is reduced to two. In addition, the engagement between the second and third gear is not via a gear mesh, which eliminates the accumulation and subsequent amplification of backlash in the system. Also, the fact that the helical gears have crossed axes required the uses of helical gears which create less noise as the transmission of power is carried out through a sliding motion as opposed to the harsh tooth to tooth contact inherent to the spur gears.

Accordingly, the worm/worm gear configuration creates a more cost efficient and a quieter actuator 10.

The actuator 10 has a housing 28 and an associated cover 30 as well as an unlock switch 32 and a door ajar switch 34.

The unlock switch is mounted to an unlock switch carrier 36 while the door ajar switch 34 is mounted to a door ajar switch carrier 38.

As mentioned above, worm gear 20 is operatively coupled to a worm 18 which is rotatably driven by motor 14. Gear 26 is rotatably mounted to worm gear 20 about axis 24 such that gear 26 can rotate with respect to worm gear 20 about axis 24. Gear 26 also has a protrusion 40 that is located between a pair of features 42 and 44 of worm gear 20 such that as worm gear 20 rotates in one direction (e.g., clockwise) from a home or central position and the actuator 10 is in the locked position illustrated in FIGS. 3 and 4, feature 42 will contact protrusion 40 and thus rotate gear 26 clockwise and accordingly move rack 12 linearly in the direction of arrow 46 between a first position and a second position with respect to the actuator 10 so that the actuator is now in the locked position illustrated in FIGS. 5 and 6.

Figure 1:
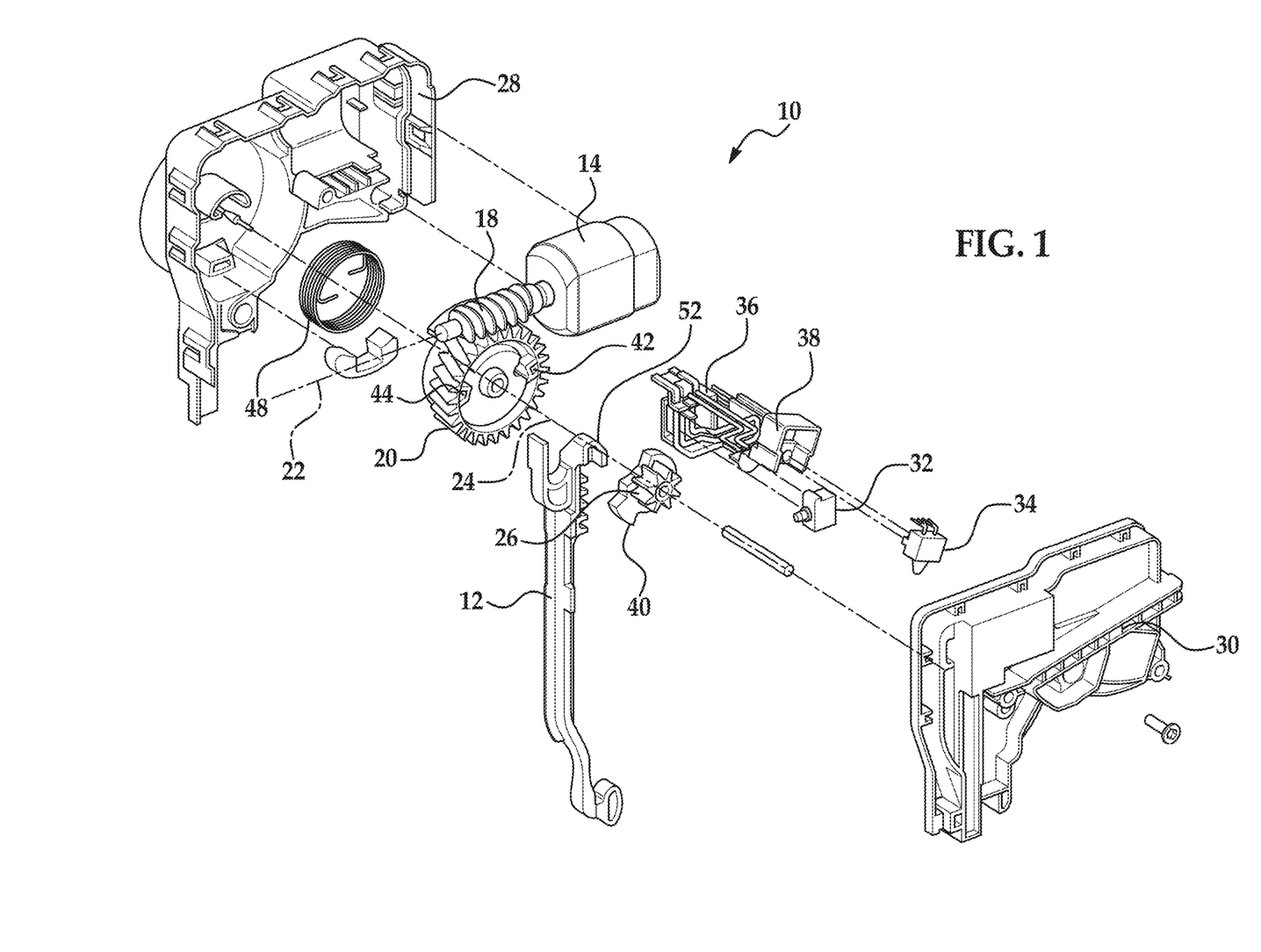
FIG. 1 is an exploded view of an actuator according to an embodiment of the present invention.
Figure 2:
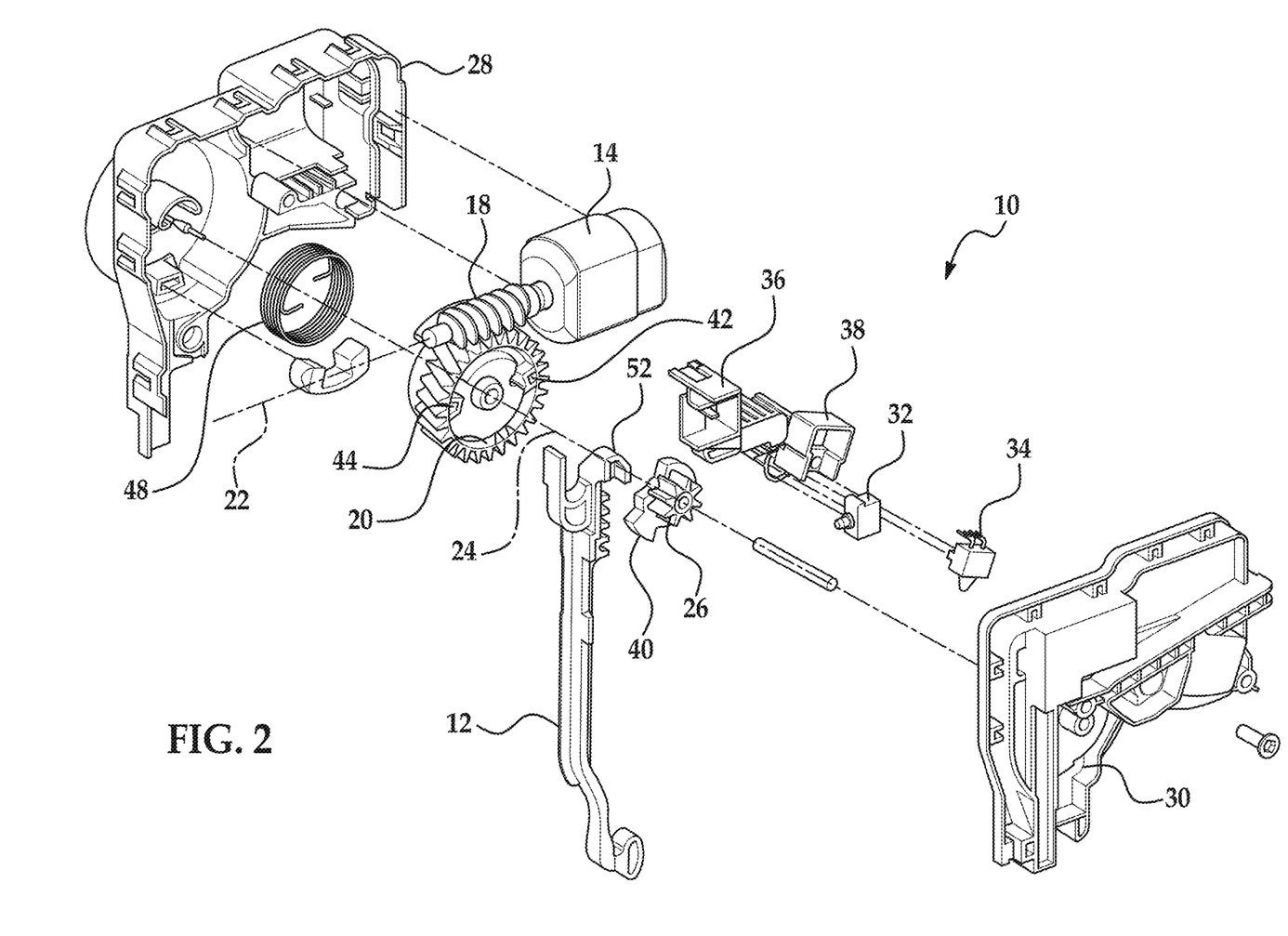
FIG. 2 is line drawing of the view of FIG. 1.
Figure 3:
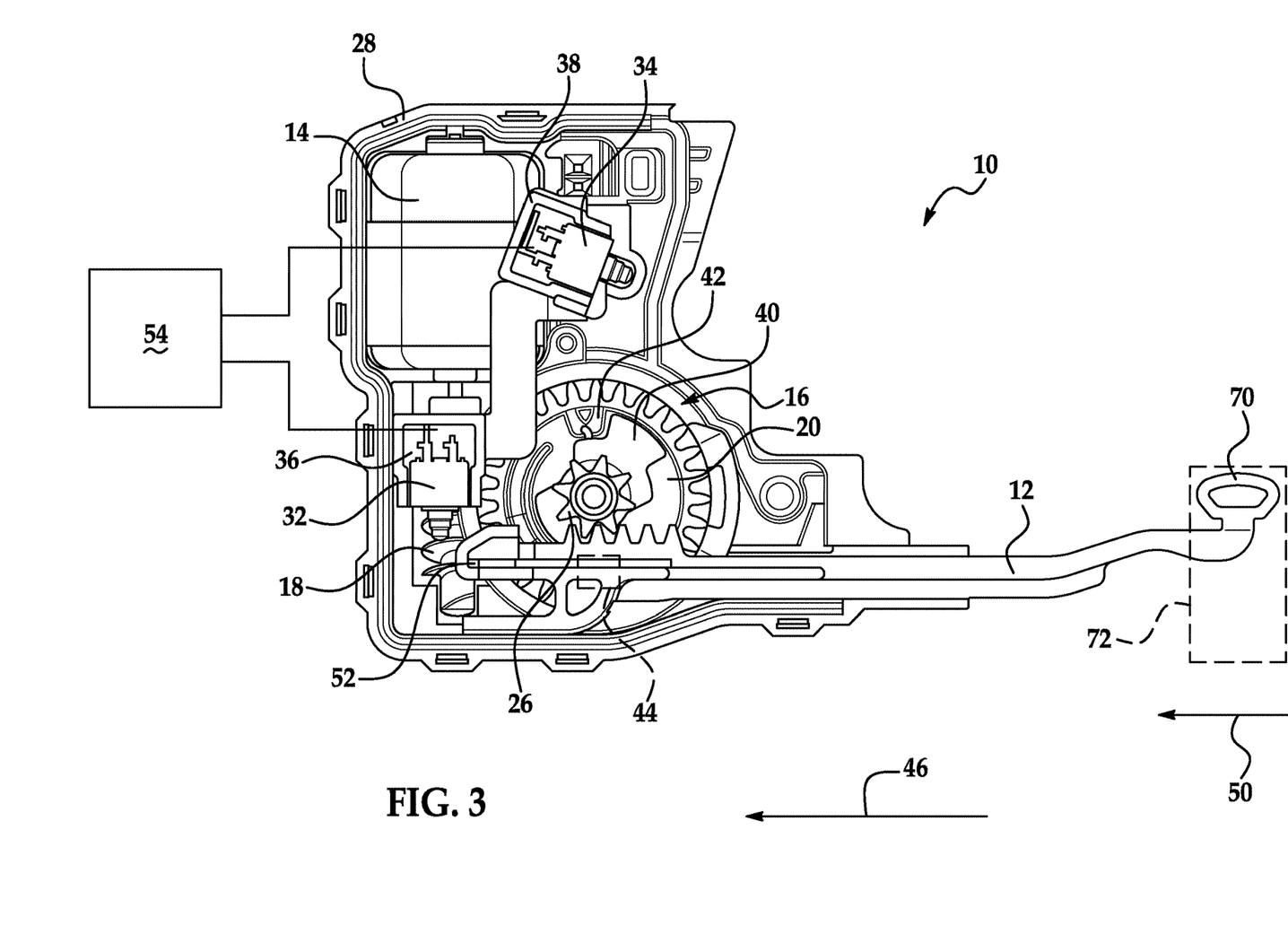
FIG. 3 is a view of the actuator in a locked state.
Figure 4:
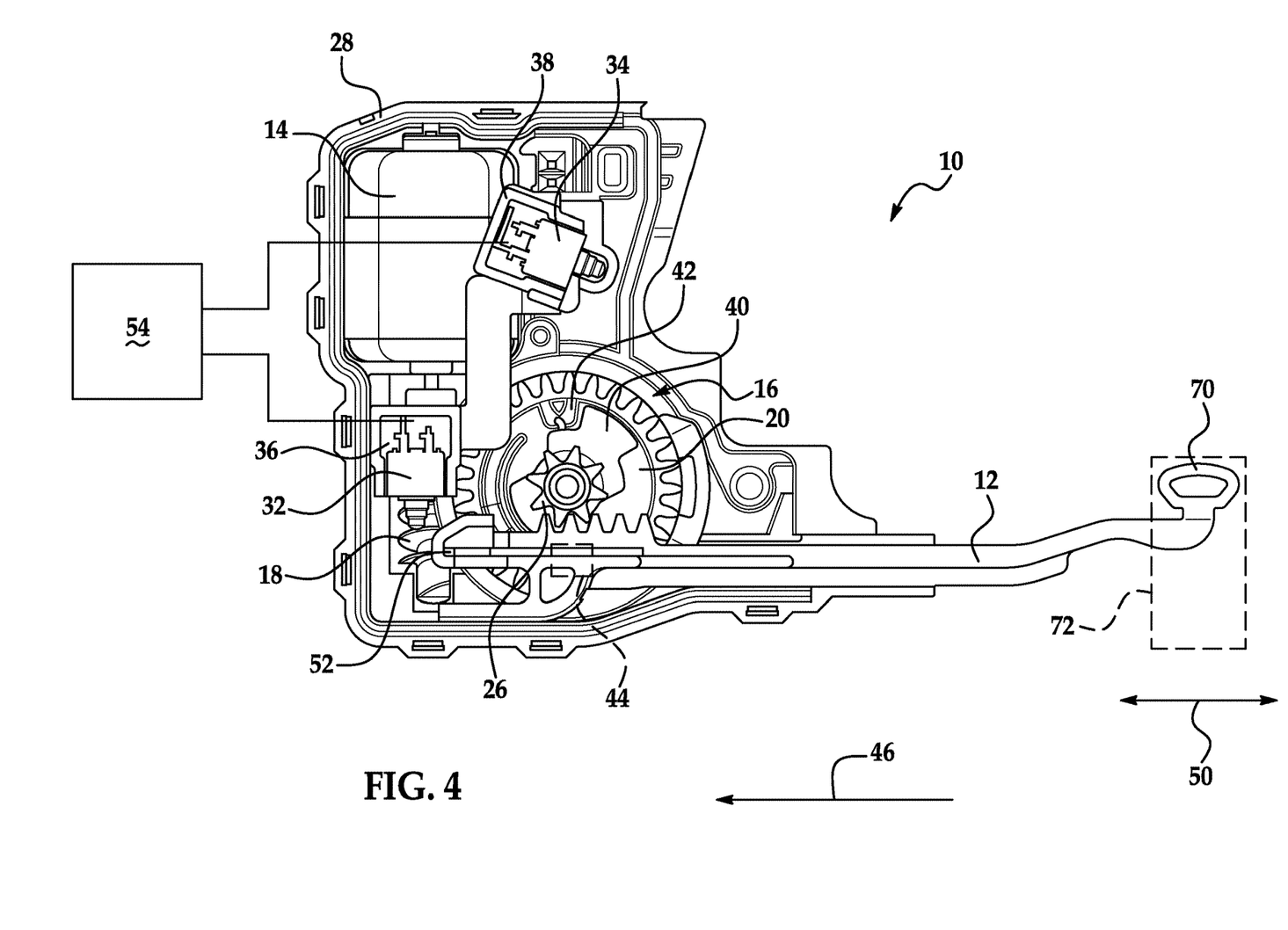
FIG. 4 is line drawing of the view of FIG. 3.
Figure 5:
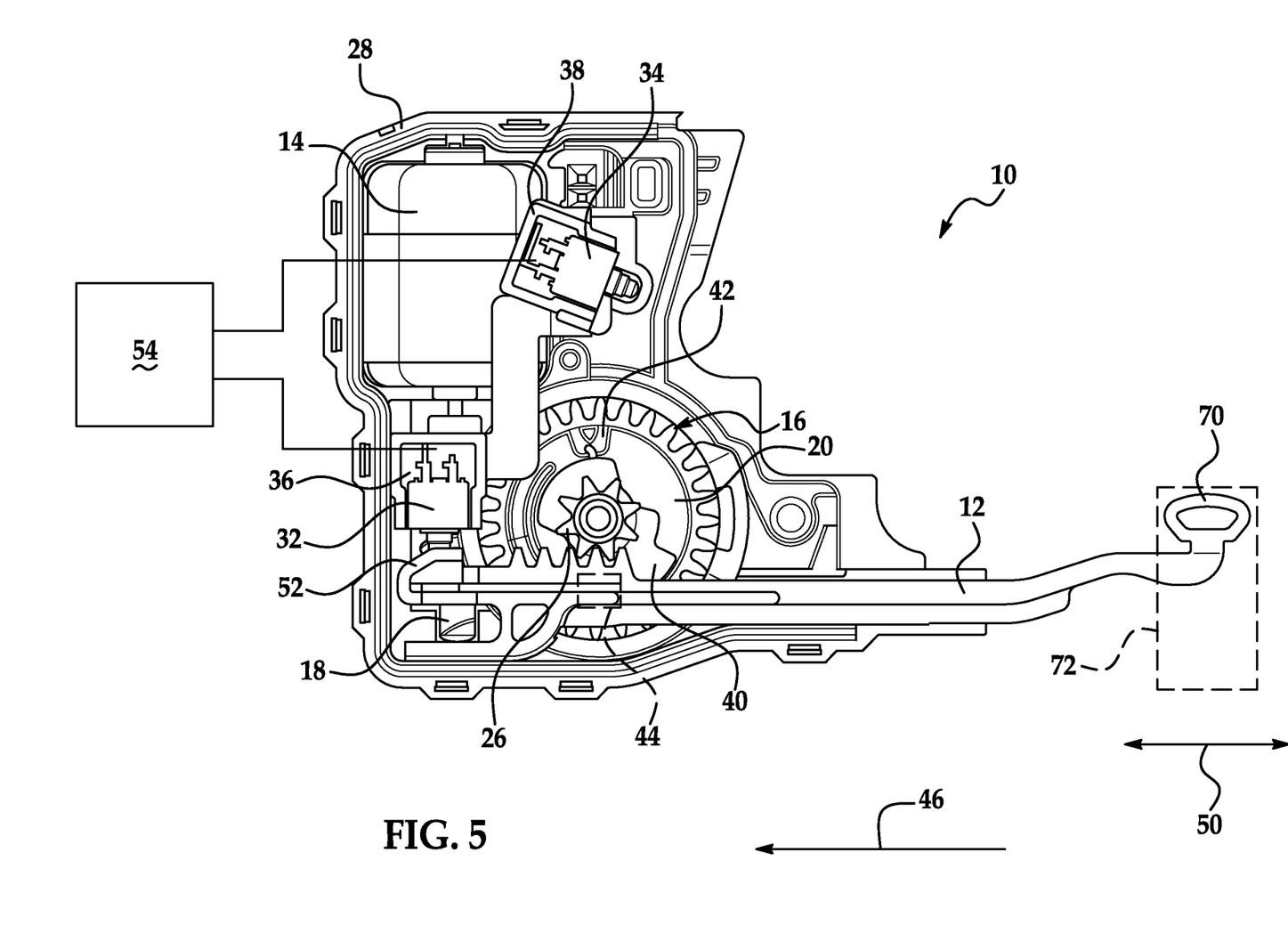
FIG. 5 is a view of the actuator in a unlocked state.
Figure 6:
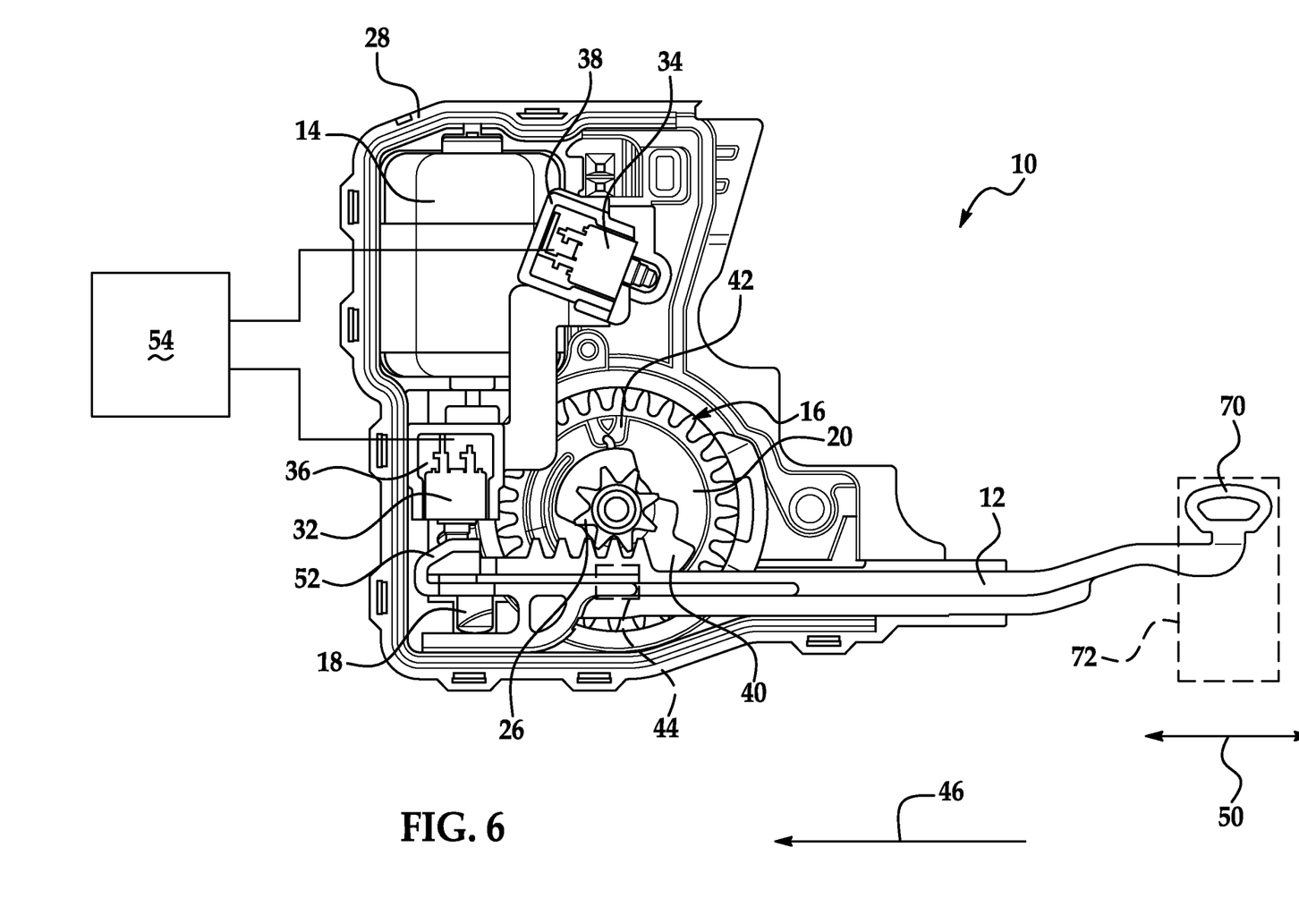
FIG. 6 is line drawing of the view of FIG. 5.

After this movement, the worm gear 20 returns to the home or central position illustrated in FIGS. 3 and 4 via counter clockwise movement while gear 26 stays in the position illustrated in FIGS. 5 and 6. In other words and when viewing FIGS. 3-6, clockwise movement of the worm gear 20 from the central or home position of FIGS. 3 and 4 will move gear 26 clockwise and rack in the direction of arrow 46. Afterwards, worm gear 20 is spring biased to rotate counter clockwise back to the home or central position illustrated in FIGS. 3 and 4 as well as FIGS. 5 and 6 via a return spring 48 however, gear 26 and rack 12 stay in the position illustrated in FIGS. 5 and 6.

When the actuator is in the position illustrated in FIGS. 5 and 6, feature 44 of the worm gear is adjacent to protrusion 40 and thus counter clockwise movement of worm gear 20 will then rotate gear 26 in a counter clockwise manner and accordingly move rack 12 in a direction opposite to arrow 46 and thus move the rack from the unlocked position (FIGS. 4 and 5) to the locked position of (FIGS. 3 and 4). Once in this position, the return spring 48 rotates the worm gear 20 in a clockwise direction back to the home or central position illustrated in FIGS. 3 and 4 such that feature 42 is now positioned to contact protrusion 40 when worm gear 20 is rotated clockwise.

It being understood that in one embodiment, the distance between features 42 and 44 is larger than protrusion 40 so that the aforementioned movement of worm gear 20 with respect to gear 26 is possible.

The return spring 48 is configured to be located between the housing 28 and worm gear 20 in order to provide a biasing force to return the worm gear 20 back to the home or central position after the motor 14 is de-energized such that either feature 42 or 44 is positioned to make contact with protrusion 40 depending on the state of the latch or actuator 10 (e.g., locked or unlocked). Accordingly and through the rotational movement of the worm gear 20 in opposite directions linear movement of the rack 12 in the direction of arrows 50 is possible.

A switch 32 is positioned to be actuated by a surface or cam surface 52 of the rack 12 as it moves in the directions of arrows 50 between the locked and unlocked positions. As such movement of the rack or its current location or state is determined by the state switch 32 is in (e.g., closed or open depending on the location of surface or cam surface 52 of rack 12). When activated, the motor 14 will drive the gear system or gear train 16 and move the rack 12 linearly. The rack 12 and/or the actuator 10 and accordingly the associated latch will stay in the locked or unlocked position until the motor 14 is once again activated and the state of the actuator changes (e.g., from locked to unlocked or unlocked to locked). Spring 48 returns the worm gear to a central position or home position so that either one of features 42 or 44 is ready to contact protrusion 40 depending on the state of the actuator (e.g., locked or unlocked). This will occur when the motor 14 is operated in one of two directions and reversing the flow of current to the motor 14 will reverse the direction of the motor 14 and move the rack 12 in an opposite direction thus, changing the state of the actuator 10 from lock to unlock or vice versa. Once the state has been changed the spring 48 will again return the gear train 16 and/or worm gear 20 to a central position so that either feature 42 or 44 is ready to contact protrusion 40.

As illustrated and as mentioned above, the cam surface 52 of the rack 12 is integrally formed therewith and the cam surface is configured to actuate switch 32 as the rack 12 is moved linearly. This allows the actuator 10 to have a more cost efficient design as the number of separately required components are reduced as the rack 12 is used as a multifunctional component.

For example and as discussed above, the rack 12 is a link between a gear of the gear train and an arm or a lever of the latch in order to transmit the force and travel given by the actuator. The system also accommodates for loss of travel in order to avoid back driving the gearing system when the mechanism is subjected to a manual operation. The cam feature 52 allows the position of the actuator to be detected by activation of a switch, which negates the need for a separate component to sense the position of the actuator. Since the lock/unlock switch 32 is integrated into the actuator 10 the necessity for an exclusive connector for a switch outside of the actuator was eliminated and electrical traces are optimized as there is now a common terminal for several switches.

Also, a feature 70 is located at an end portion of the rack 12. The configuration of the feature 70 allows for a bumper to be eliminated from the interface between the rack 12 and a lock/unlock lever 72 (illustrated schematically in FIGS. 3-6). The configuration of feature 70 allows for it to be received in a complimentary opening or feature of the locking lever 72 operatively coupled to the rack 12 and the cooperation of feature 70 and its associated opening or feature of the locking lever 72 reduces the need for a bumper to reduce the noise between these components. Accordingly, a multifunctional rack 12 is provided.

Switches 32 and 34 are operatively coupled to a controller or microcontroller 54 that is provided with the states of switches 32 and 34 and can thus operate the motor 14 in the aforementioned opposite directions based upon the states or information received from the switches 32 and 34 or at least switch 32.

This arrangement or design disclosed herein also allows for a compact design. In addition, this design or arrangement also allows for less movable components required to be located between the motor 14 and the rack 12 thus reducing cost, noise, size requirements, possible wear issues etc.

Reduction in the number of components and/or gears reduces the sensitivity of the transmission between the components and/or gear as the backlash between each pair of gears is minimized due to the reduced amount of pairs of gears. Also, the time required to lock and unlock the latch by the motor is reduced as the motor does not have to overcome lost motion created by accumulated backlash. Moreover, reduced backlash between each gear reduces the amount of noise created by the actuator. Still further, the gear train system provides desired gear train ratios without numerous gears and gear pairs nor does it require a parallel shaft gear train.

As used herein, the terms "first," "second," and the like, herein do not denote any order, quantity, or importance, but rather are used to distinguish one element from another, and the terms "a" and "an" herein do not denote a limitation of quantity, but rather denote the presence of at least one of the referenced item. In addition, it is noted that the terms "bottom" and "top" are used herein, unless otherwise noted, merely for convenience of description, and are not limited to any one position or spatial orientation.

The modifier "about" used in connection with a quantity is inclusive of the stated value and has the meaning dictated by the context (e.g., includes the degree of error associated with measurement of the particular quantity).

While the invention has been described with reference to an exemplary embodiment, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

What is claimed is:

1. An actuator for a latch, comprising:
    a motor operatively coupled to a gear train; and
    a rack moveably mounted to the actuator for linear movement with respect to a housing of the actuator, wherein the gear train comprises: a worm; a worm gear and a pinion gear, wherein the pinion gear is rotatably mounted to the worm gear and the pinion gear has a plurality of teeth that engage a portion of the rack, wherein the pinion gear does not meshingly engage the worm gear and wherein the pinion gear has a protrusion that is movably located between a pair of features of the worm gear, the pair of features comprising a first protrusion and a second protrusion, the first protrusion being separate from the second protrusion, and wherein an axis of rotation of the worm is perpendicular to the axis of rotation of the worm gear and the pinion gear and rotational movement of the pinion gear with respect to the worm gear occurs without a corresponding rotational movement of the worm gear;
    wherein the rack contacts a switch when it is moved from a first position to a second position by the gear train; and
    wherein the switch is operatively coupled to a microcontroller that is provided with a state of the switch and the microcontroller operates the motor in opposite directions based upon the state or information received from the switch.

2. The actuator as in claim 1, wherein the rotational movement of the pinion gear causes linear movement of the rack.

3. The actuator as in claim 1, wherein only three gears operably couple the rack to the motor.

4. The actuator as in claim 3, wherein the worm is directly coupled to the motor and the worm gear and wherein the worm gear is operably coupled to the pinion gear and the pinion gear is operably coupled to the rack.

5. The actuator as in claim 1, wherein only three gears operably couple the rack to the motor and a number of gear meshes or gear pairs of the three gears is two.

6. The actuator as in claim 1, wherein the worm gear is spring biased into a neutral position.

7. The actuator as in claim 1, wherein the worm gear is spring biased into a neutral position after it has been rotated either clockwise or counter clockwise from the neutral position by the motor in order to linearly move the rack, wherein the rack remains in its position after it has been moved by the worm gear and the worm gear is subsequently moved back into its neutral position.

\* \* \* \* \*